Figure 11:
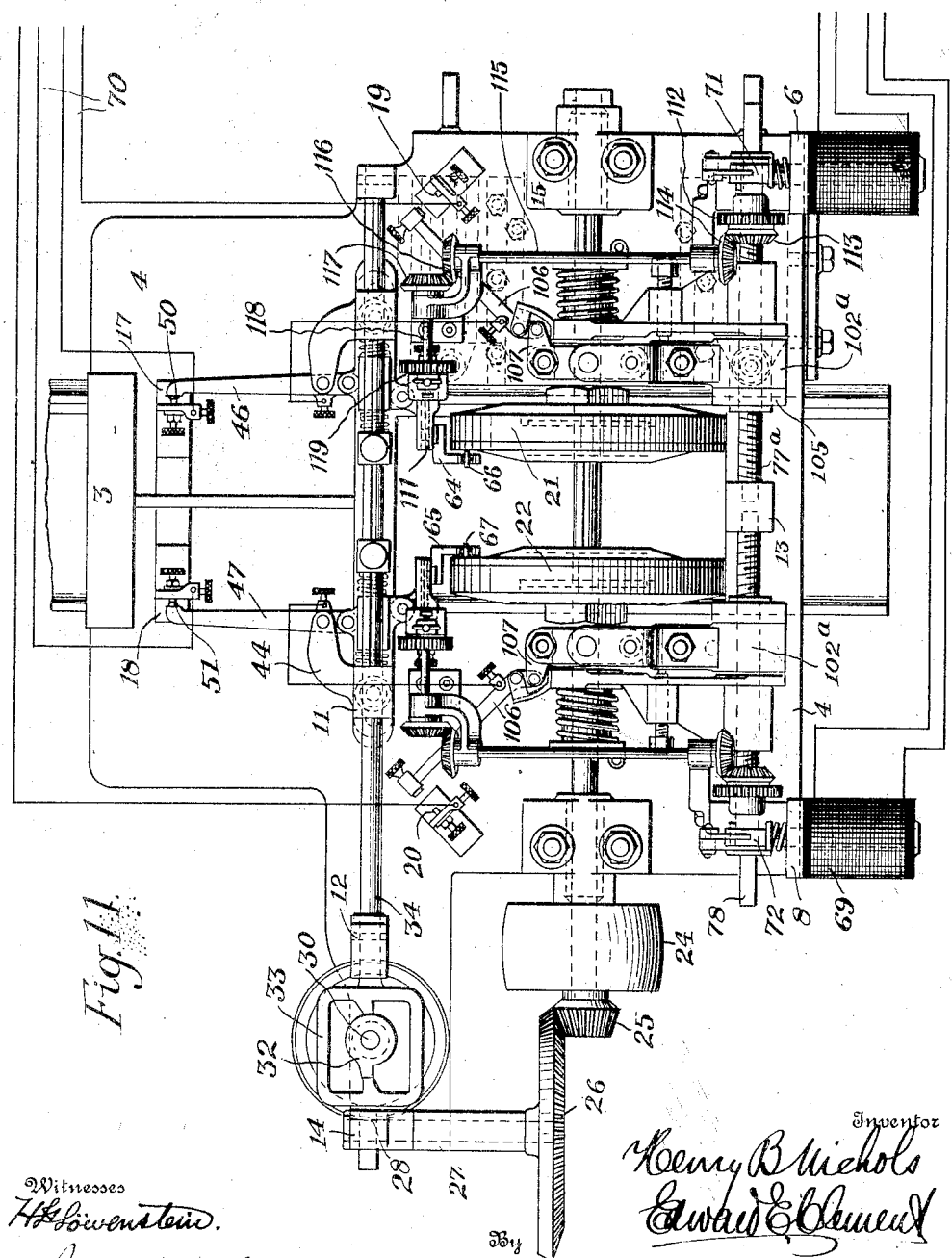

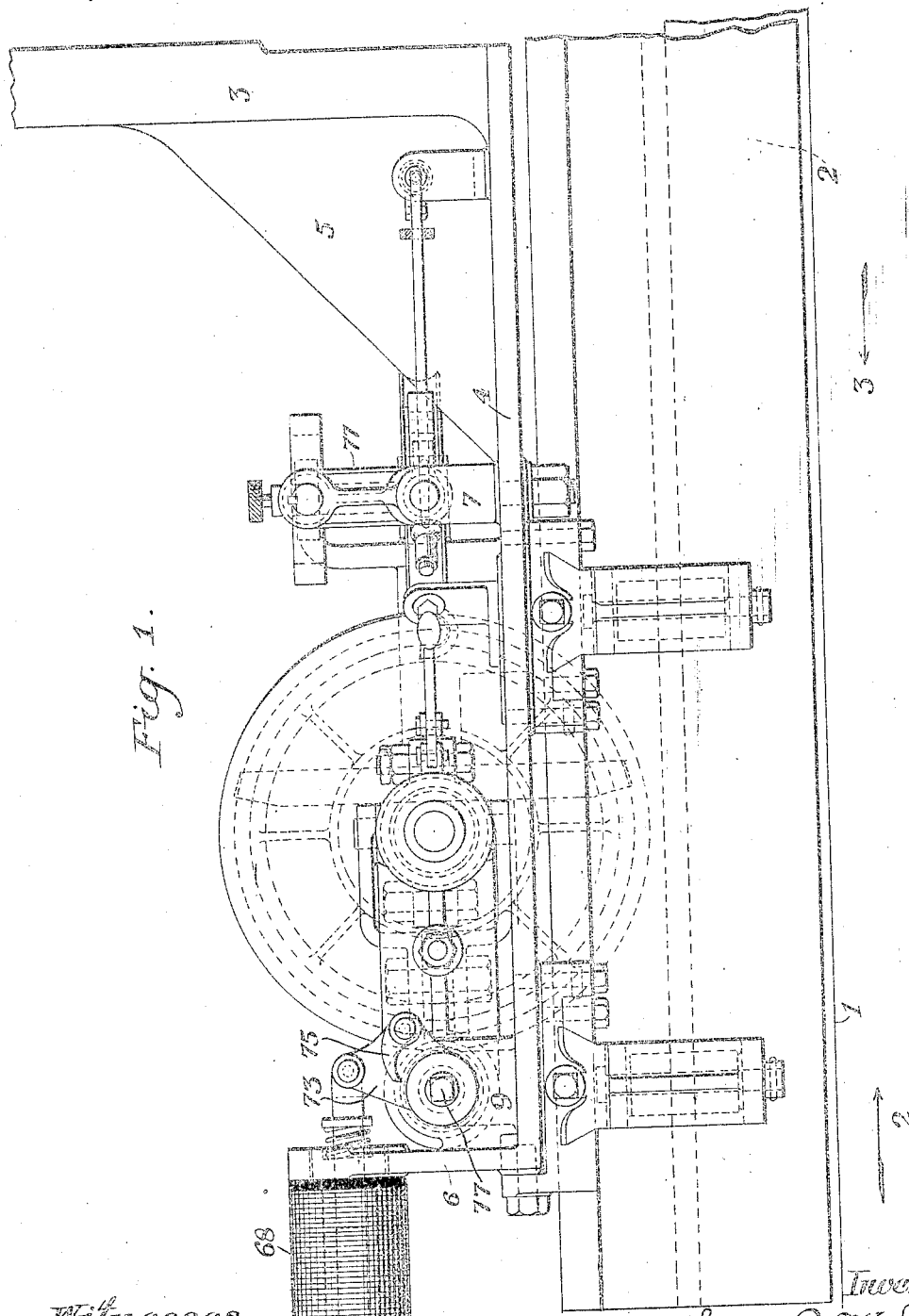

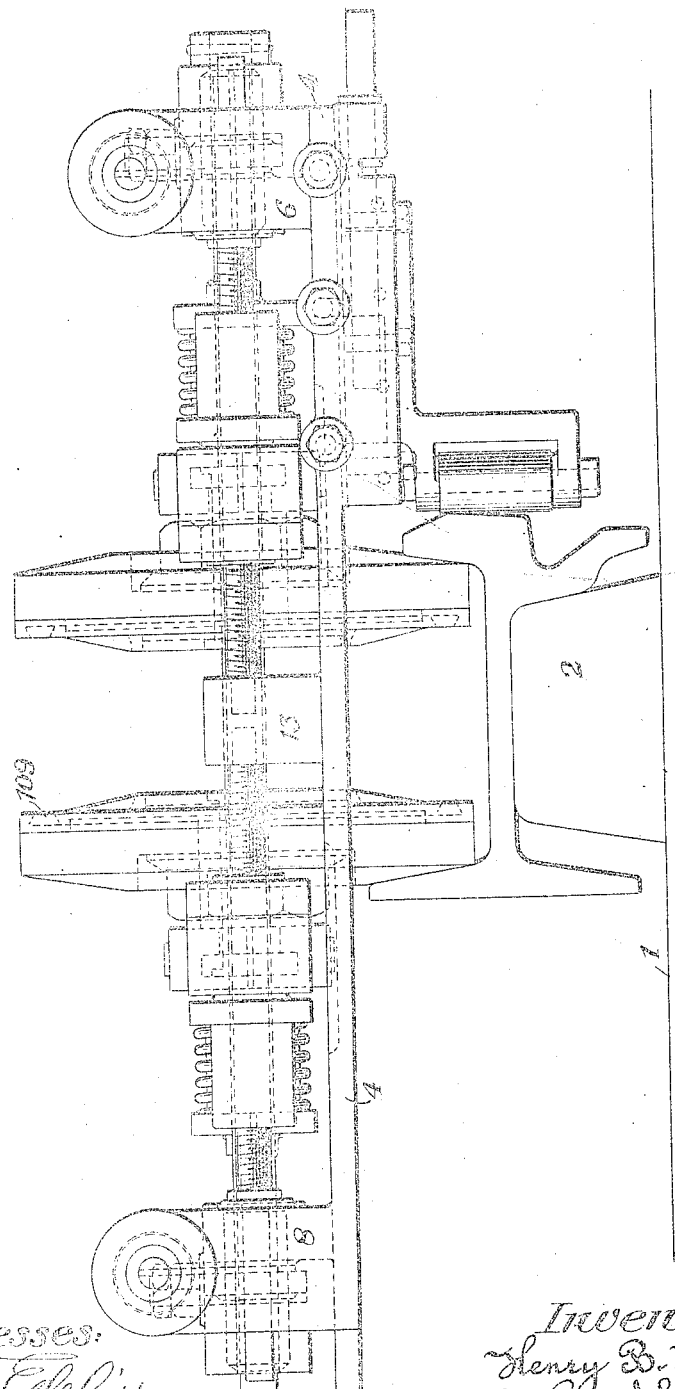

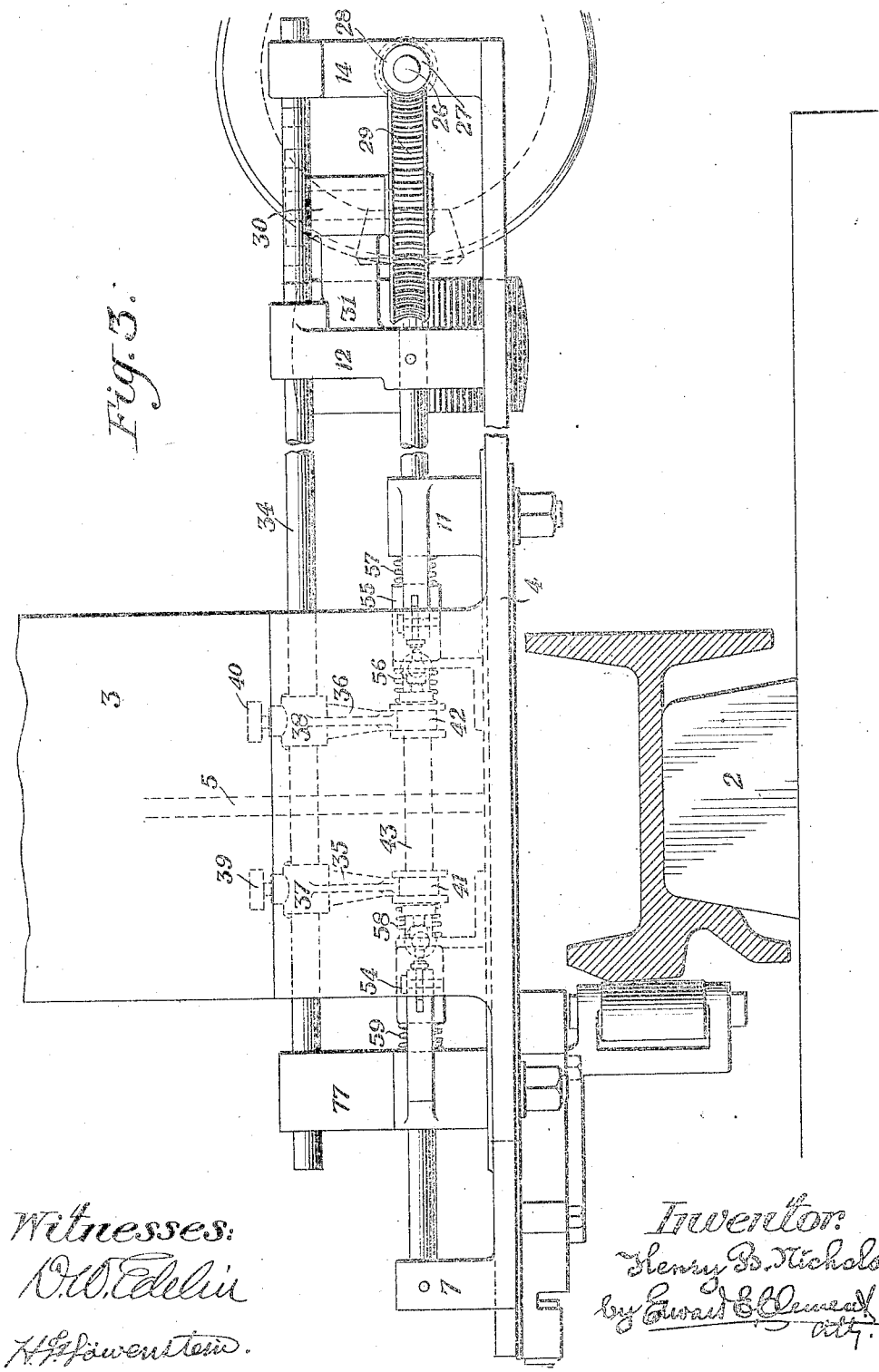

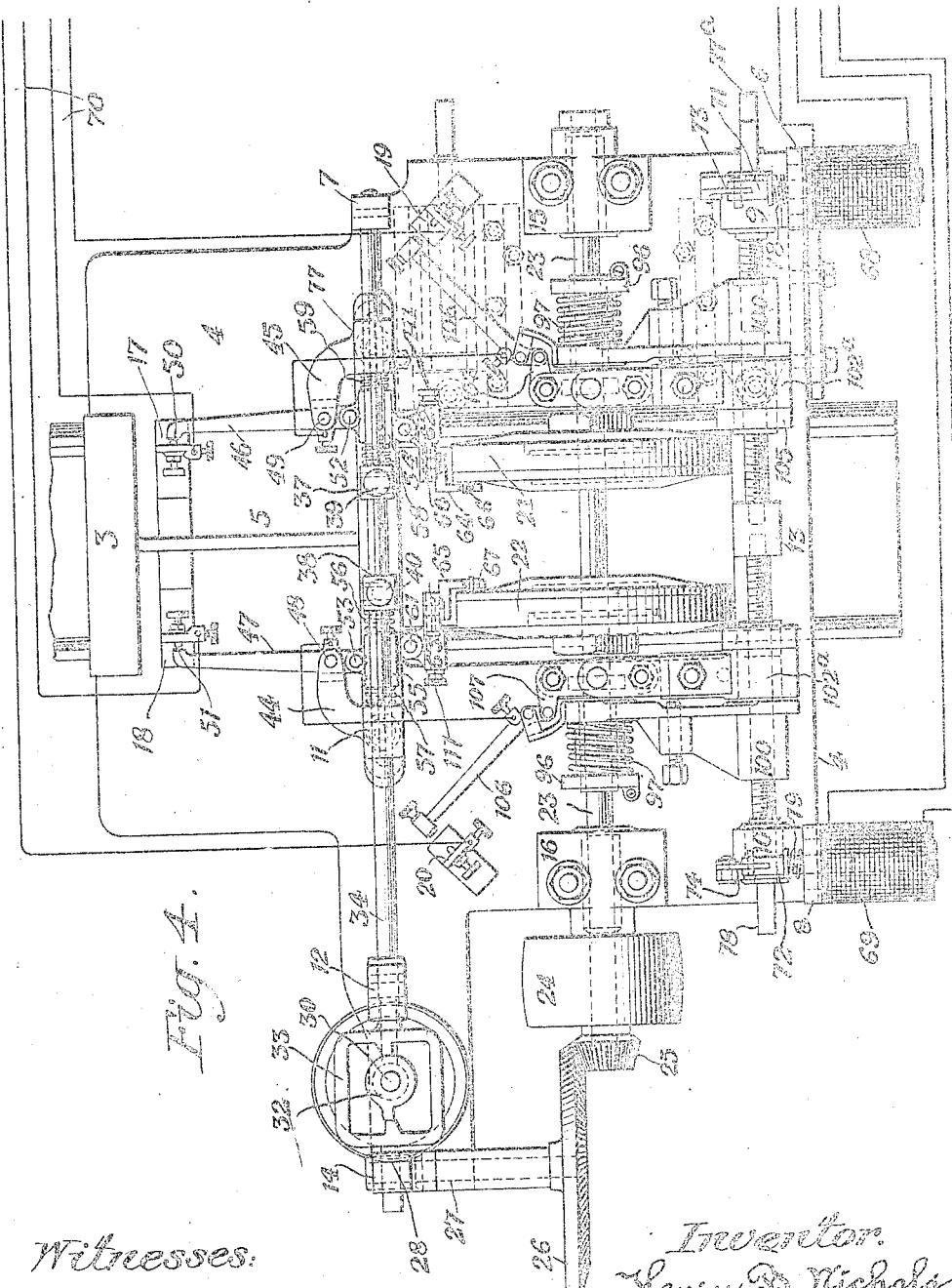

H. B. NICHOLS.
GRINDING MACHINE.
APPLICATION FILED JAN. 14, 1909.
944,903.
Patented Dec. 28, 1909.
9 SHEETS—SHEET 5.
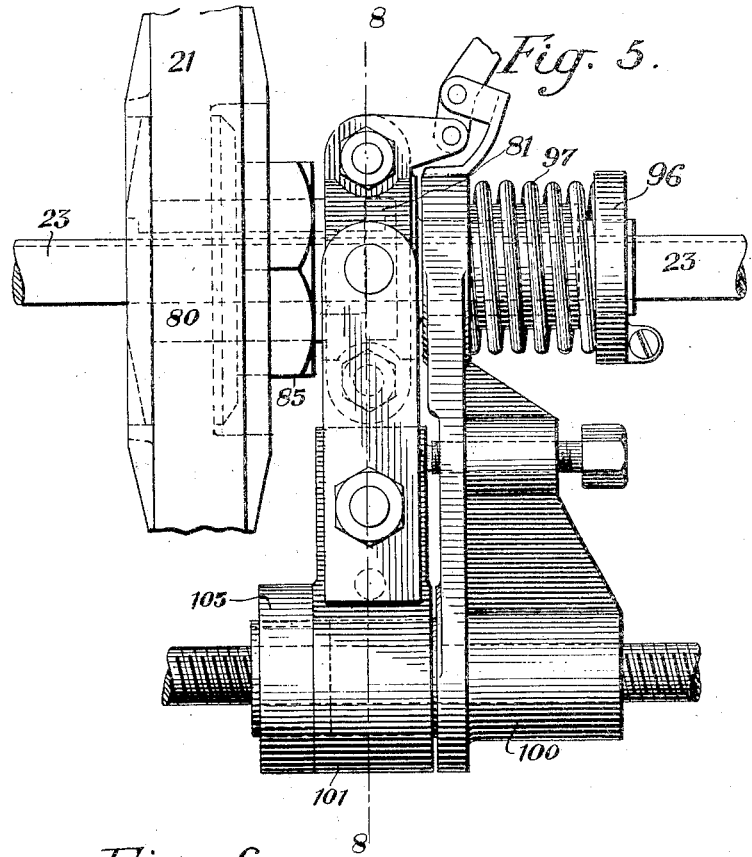
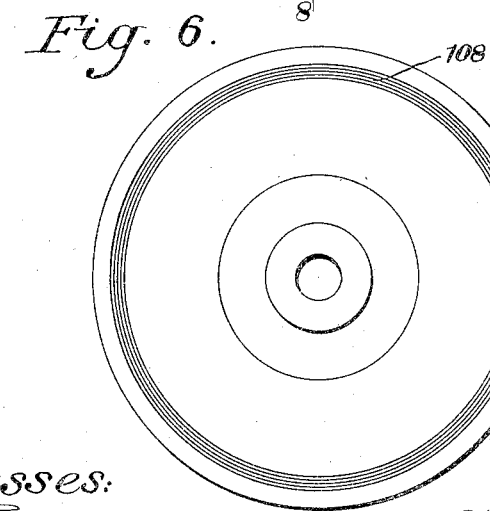

H. B. NICHOLS.
GRINDING MACHINE.
APPLICATION FILED JAN. 14, 1909.
944,903.
Patented Dec. 28, 1909.
9 SHEETS—SHEET 6.
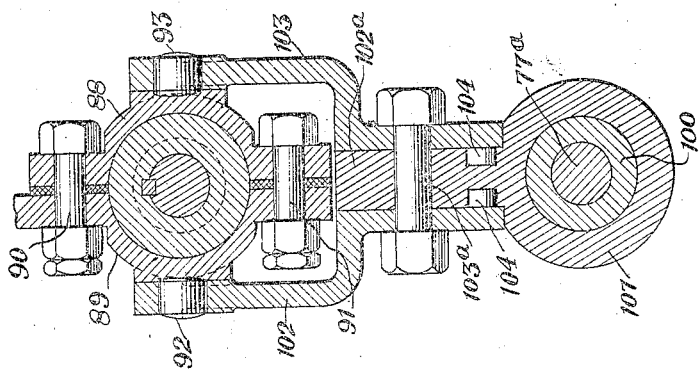
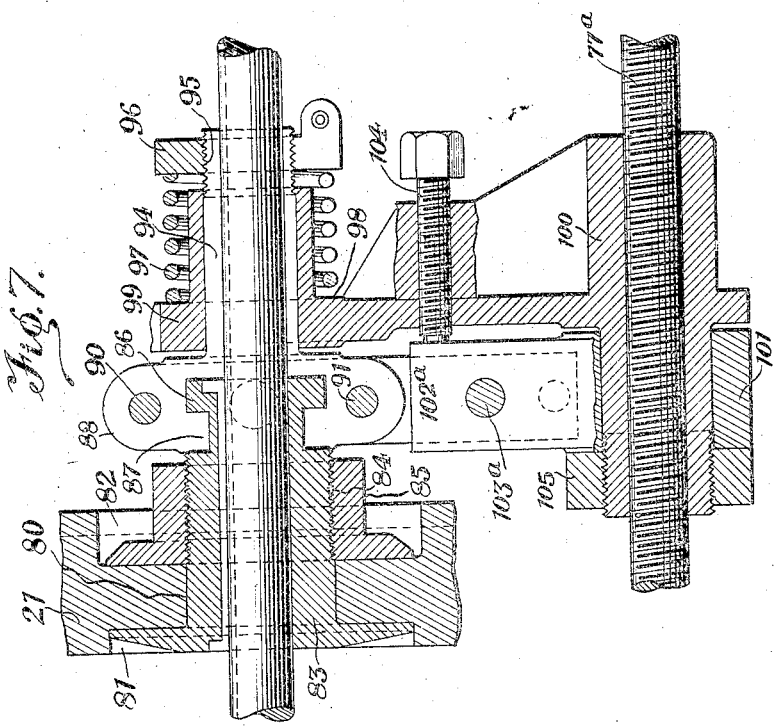

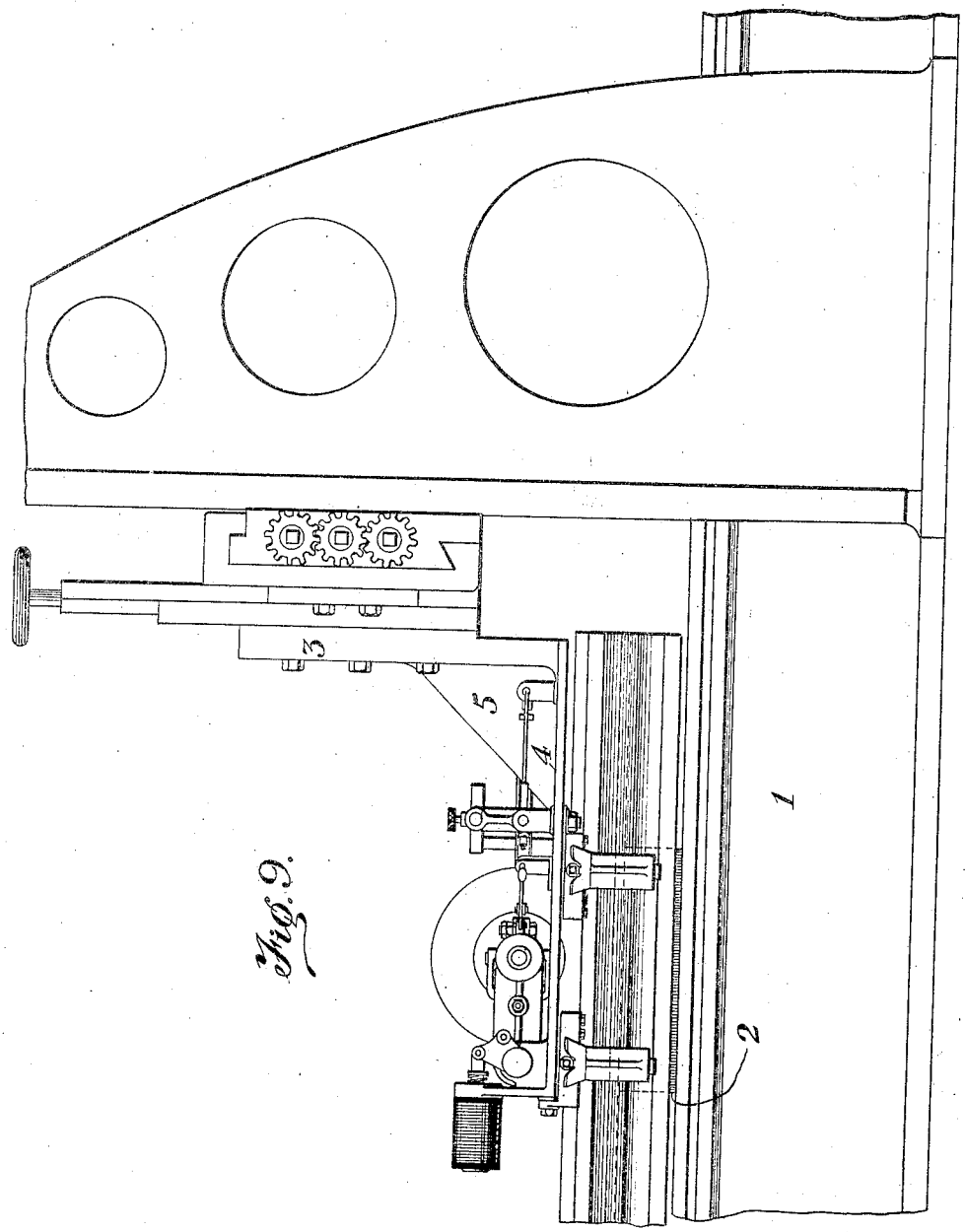

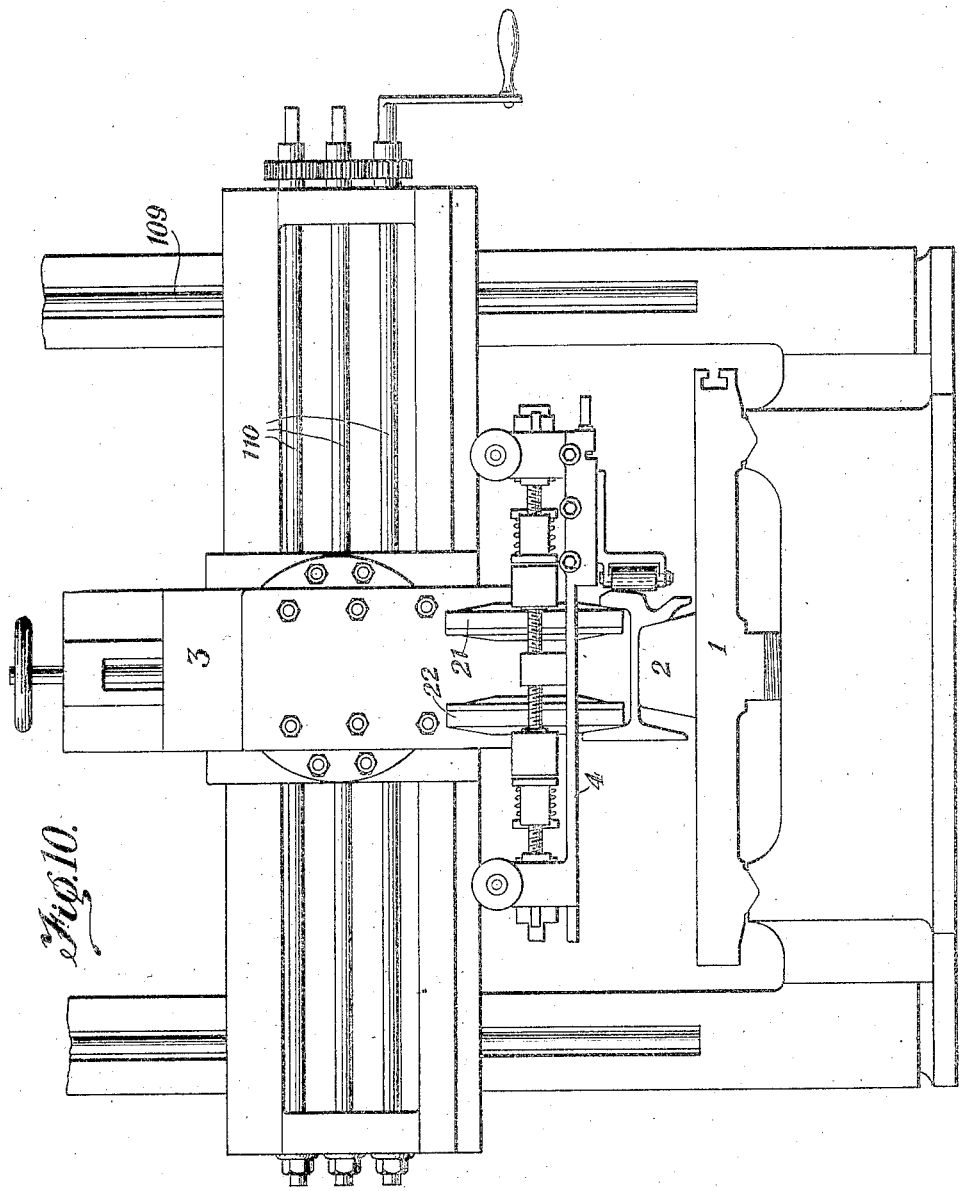

H. B. NICHOLS.
GRINDING MACHINE.
APPLICATION FILED JAN. 14, 1909.

944,903.

Patented Dec. 28, 1909.
9 SHEETS—SHEET 9.

Witnesses
H. Löwenstein.
James H. Marr.

Inventor
Henry B. Nichols
Edward E. Clement
By
Attorney

UNITED STATES PATENT OFFICE.

HENRY B. NICHOLS, OF PHILADELPHIA, PENNSYLVANIA.

GRINDING-MACHINE.

944,903.  Specification of Letters Patent.  Patented Dec. 28, 1909.

Application filed January 14, 1909. Serial No. 472,236.

*To all whom it may concern:*

Be it known that I, HENRY B. NICHOLS, a citizen of the United States, residing at Philadelphia, in the county of Philadelphia and State of Pennsylvania, have invented certain new and useful Improvements in Grinding-Machines, of which the following is a specification, reference being had therein to the accompanying drawing.

My invention relates to metal working machines, and especially to grinding machines.

It has for its object the production of a machine of this class capable of very accurate surfacing work, and especially such a machine for grinding railway rails.

The standard type of railway rails now in common use has head and foot flanges with a connecting web, constituting in effect a girder. These rails are rolled, and the form and dimensions of their several parts are subject to some variation. The commonest form of traction rail for urban lines has either a grooved head or a lateral tram flange extending out laterally to form a channel with inclined faces. In either case the actual rolling surface for the wheels is upon the top of the rail head, so it becomes a matter of considerable importance to have these heads truly alined upon their upper surfaces. This can only be accomplished however by absolute uniformity at the rail ends and accuracy of fitting in the joints.

Disregarding welded joints, which are no longer in accordance with the best practice, and also disregarding various impracticable schemes which have been proposed from time to time for joining rail ends by means of lugs or the like formed on the rails themselves, all commercial types of rail joint employ some form of fish-plate or its equivalent. The fish-plate is adjusted upon the rail with inclined flanges along its upper and lower edges resting against corresponding inclined surfaces on the lower side of the rail head and the upper side of the foot flange. The alinement of two conjoined rail ends is therefore based upon and determined by the accuracy of surfacing of these faces. The angles of the surfaces also constitute a factor, because in drawing up the fish-plates, a slight variation in angle would raise or lower the rail a perceptible amount, to the detriment of the joint. The thickness of the rail foot is a secondary matter, but it will be observed from what has already been said that the thickness, that is to say the depth, of the rail head, must be absolute and invariable in order to secure results. Moreover, the distance between the opposed adjacent surfaces of the head and foot must be constant, as well as their relative angles, for reasons already stated. It will be noted that in any machine intended for surfacing these head and foot flanges, several important requirements must be met. In the first place longitudinal feed must be provided between the work and the tool, together with some means of gaging distance from the rolling surface on the head of the rail, during the feed. In the second place, since continuous operation is necessary for the attainment of efficiency, means must be provided to continuously compensate for wear on the tool. In the third place, since lateral compensating feed as well as longitudinal feed is involved, the adjustment must be adapted to the moving parts or tools if the main feed is linear.

I meet the foregoing requirements in the present case by the following construction: (1) A bed or work support with a superposed frame carrying a pair of oppositely disposed grinding or cutting tools—herein shown and described as grinding wheels, turned by the same spindle, and means to produce relative feed between the work and the tools so as to alter the line of cut; (2) means are provided for calipering the tools instead of the work during operation, and for adjustment in accordance with the condition thereof; (3) permanence of adjustment and strength of working parts are secured by right line construction, using for this purpose angular grinding wheels or tools with inclined cutting faces or edges.

The rail to be ground is supported over a form on a bed-plate which may be similar and have a similar feed to that of the ordinary planer. Supported above this bed is a bridge, and on the bridge is carried a frame having a vertical and a horizontal member. The horizontal member carries a transverse spindle with a pair of grinding wheels splined on it, driving and feeding mechanism for the same, and a pair of automatic calipers which maintain the lines of cut constant. The grinding wheels have annular inserts of a graphite composition in their backs or clamping plates, and as the faces wear away, these graphite rings retreat, as the wheels are moved forward by spring pressure, thereby enabling the calipers to close certain electrical contacts which actuate the feed devices. In order to prevent the constant closing of these circuits when there is no work in the machine I provide a pair of supplemental contact levers which open when the wheels make an extreme forward movement.

Grinding wheels of one kind herein employed, having graphite inserts in their surfaces, are shown and described, and also claimed, in my prior application filed Sept. 5, 1908, Serial Number 451,875. In that case, however, the inserts are in the faces of the wheels, and in the present case I caliper on the back. In the former case the graphite rings are worn away along with the wheel surfaces; in the present case they are not worn away at all. In the former case it was necessary to have a flat faced wheel, as otherwise there would be a portion of the work unground; in the present case I am enabled to use a cone-faced wheel, for grinding inclined surfaces, and still maintain my right line construction although calipering on a ring which responds to and indicates wear.

I have described and claimed automatic calipers in prior applications other than that hereinbefore referred to, for example Serial No. 399,699, filed October 29, 1907. In that case I calipered the work, in the more recent application I calipered the face of the wheel, and I believe the present case is the first to show the idea of regulating feed by movement of the wheel as determined from some other portion of its surface than the cutting face. I shall therefore claim the same broadly, as well as the several features of construction ancillary and supplemental thereto, which will sufficiently appear from the detailed description hereinafter.

My invention is illustrated in the accompanying drawing in which:

Figure 1 is a side view of the tool support and parts mounted thereon embodying my invention. Fig. 2 is an end view looking in the direction of the arrow 2 in Fig. 1. Fig. 3 is an opposite end view looking in the direction of the arrow 3 in Fig. 1. Fig. 4 is a plan view on a somewhat reduced scale. Fig. 5 is a detail view on an enlarged scale of one grinding wheel and the parts which regulate its feed. Fig. 6 is a back elevation of one of the grinding wheels. Fig. 7 is a sectional view of Fig. 5. Fig. 8 is a sectional view taken on the line 8—8 of Fig. 5. Fig. 9 is a side view of the entire machine assembled. Fig. 10 is an end view thereof looking in the direction of the arrow 2 in Fig. 1. Fig. 11 is a plan view on a reduced scale showing a modified arrangement of the calipering mechanism.

Referring to the drawings, 1 is a bed plate carrying a form 2, upon which the work is supported. Above the bed plate a bridge is provided, to which is bolted the upper member 3 of a bracket frame or tool support 4. This bracket frame is stiffened by a central diagonal web or flange 5, and carries upon it vertical bearing posts 6, 7, 77, 8, 9, 10, 11, 12, 13, 14, journal boxes 15 and 16 and contact posts 17, 18, 19, 20. The two grinding wheels 21 and 22 are splined in a manner that will presently be described, upon the driving shaft 23 journaled in the boxes 15 and 16, and carrying upon one end the driving pulley 24, as well as the bevel pinion 25 which intermeshes with and drives the bevel gear 26 journaled at 27 (see Figs. 3 and 4) and carrying at its other end a worm 28 which engages a worm gear 29 on the vertical stub shaft 30 journaled in a box on the end of a horizontal arm 31 extending from the bearing post 12, and carrying at its upper end a cam disk 32 which as it turns throws the frame 33 back and forth so as to oscillate the shaft 34, which carries depending fingers 35 and 36, secured to the shaft by sleeves 37, 38 and set-screws 39 and 40. The ends of the fingers 35 and 36 lie between flanges on the collars 41 and 42, mounted to slide on the fixed parallel shaft 43, passing through the posts 7, 11 and 77. On each of the posts 11 and 77 a bracket arm is provided as indicated at 44 and 45, the extremities of these bracket arms being bifurcated to receive the caliper levers 46 and 47, which are pivoted at 48 and 49, and carry at one extremity 50 or 51 a contact to coöperate with the fixed contacts 17, 18, and have at the other extremity a knuckle joint connection 52 or 53 with the sliding sleeves 54, 55 on the shaft 43. Each of these sleeves 54 and 55 has a pair of helical springs, one on each side of it, indicated at 56—57 and 58—59. The springs 57 and 59 rest against the solid abutments 11 and 77, while the springs 56 and 58 lie between the sleeves 54 and 55 and the collars 41 and 42. Any movement of the sleeves 54 and 55 swings the levers 46 and 47, and it will be quite obvious from the foregoing description that a normal adjustment may be obtained in which the springs are under substantially balanced tension, so that unless one spring or the other receives a greater compression, there will be no sleeve motion. This alternating compression of the springs 56 and 58 is produced by means of the fingers 35 and 36, as moved by the oscillations of the shaft 34, which in turn are due to the swinging of the frame 33 by means of the cam disk 32, rotated from the driving shaft 23.

Each of the sleeves 54 and 55 has a knuckle joint 60 or 61, by which it is connected to the holder 62 or 63 of the caliper head or "feeler", which carries an adjustable angle arm 64 or 65, having upon its extremity a steel roller 66, 67 which approaches to and recedes from the back of its respective grinding wheel 21 or 22 as its sleeve 54 or 55 oscillates. Assuming the grinding wheels to be normal, that is to say not yet worn away, and properly set on the shaft, then the oscillations of the shaft 34 will produce no effect on the caliper contacts 17—50 or 18—51, because the oscillation of the sleeves 54 and 55 due to the changes in compression of the springs 56 and 58 can only move the caliper heads or feelers as far as the back surfaces of the respective wheels, when they stop. Under normal conditions this movement is not sufficient to swing the lever 46 or 47 over so as to close its contact. If the wheel is worn away however, and its initial movement under spring tension on the shaft therefore carries it nearer to the surface of the work, (without as yet producing a working pressure thereon) then the caliper at the next oscillation moves beyond normal a distance corresponding to the initial movement of the wheel, the lever 46 or 47 is swung far enough to close upon its contact 17 or 18 and a circuit is thereby completed which includes one of the solenoids 68 or 69, which, deriving current from the supply circuit 70, immediately pulls in its core 71 or 72, turning the ratchet plate 73 or 74, also the ratchet 75 or 76 and the feed shaft 77 or 78. The solenoids are mounted on posts 6 and 8, closely adjacent to the bearing posts 9 and 10, and each core is normally retracted by a spring 78 or 79. The feed shafts are journaled respectively in the posts 9—13 and 10—13, and are right and left handed, so as to feed their respective wheels away from each other, and against the inner faces of the work.

In Fig. 11 I show a modification of the calipering mechanism whereby the feelers are made to follow up the wear and adjustment of their respective wheels. It comprises a spur wheel 112 that meshes with a spur on the shaft 77ᵃ and transmits its motion through miters 113, 114 to shaft 115, thence through miters 116, 117 to shaft 118, which carries a spur 119, meshing with a spur on the feed shaft 111, thus feeding the bracket 64 and feeler 66 toward the grinding wheel 21.

The connection of the grinding wheel with the shaft 23 is shown in Figs. 5, 7 and 8, as well as the details of the feed connections with the shafts 77ᵃ and 78. As these are duplicates, arranged right and left hand respectively, a description of one will suffice for both. The wheel 21 has an opening 80 through its center, and is recessed on both faces as indicated at 81 and 82. Fitted in the opening 80 is a flanged bushing 83 threaded at 84 for the reception of a flanged nut 85, the flanges of the bushing and the nut lying in the recesses 81 and 82 respectively. The bushing has an extension 86 with an annular groove 87, and to this extension are fitted a pair of gibs 88 and 89, bolted together at 90 and 91, and provided with lateral trunnions 92 and 93. Each gib has an extension bushing 94 screw threaded at its end 95 fitted with a split nut 96, forming an abutment for a compression spring 97, which lies between this abutment and the seat 98 on the arm 99 of the feed nut 100. This feed nut has an extended body threaded directly upon the shaft 77ᵃ, and forming a slide bearing for the yoke holder or supplemental nut 101. This holder carries yokes 102 and 103 for the gibs 88 and 89, the yokes being secured as follows:

Upon the body of the holder 100 a lateral plate projection 102ᵃ is formed, upon the opposite faces of which the gibs are bolted at 103ᵃ, being held against turning on the bolt by short studs 104. The outer ends of the yoke have openings to receive the trunnions 92 and 93 on the gibs, and it is apparent that by removing the single bolt 103ᵃ both yokes may be removed to permit access to or removal of the gibs. The arm or plate 102ᵃ determines the position of the parts 21, 83, 88, 89, 101 and 102—103 with respect to the arm 99 of the feed nut, its motion being limited by the regulating screw 104, tapped into the arm 99. On the other side of the arm 102ᵃ and the holder 101 is an adjusting nut 105, threaded onto the end of the body of the feed nut 100. The purpose of this double or compensating adjustment for the wheel is two-fold, first to determine an absolute limit of variation in the cut, and second to open the electric circuit controlling the feed when the machine is idle. The first object is accomplished when the part 102ᵃ abuts upon the screw 104, which may of course be set for any percentage of variation desired. The second object is accomplished by the action of the pivoted arm 106, carried upon the arm 99, and controlled by the extension 107 on one of the gibs, which opens the circuit at the contact 19 when the wheel is all the way over, that is to say when the part 102 reaches the screw 104. This condition will occur when there is no work in the machine, or when it gets out of adjustment.

Fig. 6 shows the back of the wheel, with its ring of graphite composition 108, upon which the roller 66 of the caliper bears. This ring may be similar to those described in my prior application hereinbefore referred to, but held in an undercut or dovetailed recess or groove. The composition I have employed for this ring when set into the wheel body, is formed of powdered or flake graphite held in a binder of sulfur. The sulfur is first melted, and the graphite is stirred or ground into it in the proportion of two parts by weight of graphite to one of sulfur. The wheel body having been prepared with the dovetailed recess as shown by dotted lines in Fig. 2, is heated to a uniform temperature of about 212° Fahrenheit, the graphite paste is poured or pressed into the groove, and the body allowed to cool. I prefer, however, to set the ring into the metal clamping plate on the back of the wheel, for several reasons. For one thing, this enables the use of standard or "stock" wheels; for another, it enables pure graphite to be employed, inserted in the groove under pressure which the wheel body could not resist.

The ring can be made in several other ways, as by forming a paste of water, a gum solution, or the like. In any case and whether set in the wheel body or the clamping plate, I find that the undercut groove is of value in holding the ring in place, and as it constitutes an improvement over the former arrangement I shall claim it herein.

It is thought the operation of my machine will now be clear. The main frame shown in Figs. 9 and 10 needs no description as the adjustment of the tool support 3—4 is sufficiently apparent, this being accomplished through the vertical and horizontal screws 109 and 110. A rail being in position as shown in these two figures, the wheels 21 and 22 rest against the faces to be ground with a degree of pressure determined by the adjustment of the nut 105. As the wheel wears, the spring 97 will act upon the nut 96 to draw the gib bushing 94, the gibs, the wheel, and the holder 101, toward the right in Fig. 7. This advancement of the wheel causes the caliper to close its contact (assuming that the permissible limit of variation has been reached before compensation is desired), the solenoid 68 takes current, the shaft 77 is turned, the nut 100 is fed to the right, and compensation for the wear is thus effected.

By the use of cone wheels, the angle of touch is rendered constant, and the wear on the wheels is quite uniform, due at least partly to the fact that the work is all done on a radial line in the surface of the wheel. A number of advantages will suggest themselves, due to what I have called "the right line construction", not the least of which is the possibility of direct gear transmission of power between the operating and feed mechanism, whereby positive action is secured.

I am aware that many non-essential changes and modifications may be made in the machine thus described without departing from the spirit of my invention, and it is to be understood that I contemplate all these which fairly fall within the scope of the appended claims.

Having thus described my invention, what I claim and desire to secure by Letters-Patent of the United States, is:

1. In a metal working machine, a work support, a tool and tool support, means for producing relative feed between the work and the tool, means for advancing the tool during the cut as it wears, and a feed control continuously responsive to said advancement.

2. In a metal working machine, a work support, a tool and tool support, means operative during the cut for automatically producing initial movement of the tool as it wears, means for producing a secondary movement or feed of the tool, and means responsive to the initial movement, governing the secondary movement.

3. In a metal working machine, a work support, a tool and tool support, means for driving the tool, means for feeding the same, and an automatic caliper governing said feed, said caliper determining wear on the tool by contact with a portion of its surface other than the cutting face or edge.

4. A grinding machine, having a work support with longitudinal feed, a tool support and a grinding head thereon provided with lateral feed, and an automatic caliper governing the lateral feed and responsive to wear on the wheel as determined by contact with the back thereof.

5. A grinding machine having a work support with longitudinal feed, a tool support and a grinding head thereon with lateral feed, an automatic caliper coöperating with said head to insure a uniform cut, and means acting automatically to disable the feed devices when there is no work in the machine.

6. In a grinding machine, a work support and a tool support having relative feed, a driving spindle on the tool support, a grinding wheel fitted to rotate with but to move longitudinally upon said spindle, means for positively engaging the face of said wheel with the work on a desired and predetermined line of cut, and means controlled from the back of the wheel for shifting the same along the spindle to maintain said line of cut constant.

7. In a grinding machine, a work support and a tool support having relative feed, a driven spindle on the tool support transverse to the line of said feed, a grinding wheel on said spindle, means to move said wheel on the spindle in response to wear, and means for disabling said first named means upon excessive movement of the wheel.

8. In a grinding machine, a work support and a tool support having relative feed, a driven spindle on the tool support transverse to the line of said feed, a grinding wheel on said spindle, a spring connection between the wheel and a fixed stop, whereby the wheel will have initial movement as it wears, mechanism for feeding the wheel to compensate for wear, an automatic caliper controlling said mechanism, and automatic means for disabling the feed mechanism when the initial movement of the wheel becomes excessive, as when there is no work in the machine.

9. In a grinding machine, a work support and a tool support having relative feed, a driven spindle on the tool support transverse to the line of said feed, a grinding wheel on said spindle, means to move said wheel on the spindle in response to wear, a regulating device for said means, and feed mechanism for the regulating device, all acting proportionately to the amount of wear on the wheel.

10. In a metal working machine, a work support, a tool and tool support, means for driving the tool, means for feeding the same, an automatic caliper governing said feed, said caliper determining the wear on the tool by contact on its surface other than the cutting face or edge, and means for feeding the caliper to keep it in constant regulating position with respect to the tool.

11. In a metal working machine, a work support, a tool and tool support, means for driving the tool, means for feeding the tool, an automatic caliper governing said feeding, means for feeding the caliper, and means controlled by the main feed for governing the caliper feed.

In testimony whereof I affix my signature in presence of two witnesses.

HENRY B. NICHOLS.

Witnesses:
 THOMAS DURANT,
 EDWARD E. CLEMENT.